US011936140B2

(12) United States Patent
Su et al.

(10) Patent No.: US 11,936,140 B2
(45) Date of Patent: Mar. 19, 2024

(54) RADIO-FREQUENCY CONNECTOR WITH HIGH TRANSMISSION PERFORMANCE

(71) Applicant: SUNWAY COMMUNICATION (JIANGSU) CO., LTD., Changzhou (CN)

(72) Inventors: Yule Su, Shenzhen (CN); Stanley Wang, Changzhou (CN); Ren-Chih Li, Changzhou (CN)

(73) Assignee: SUNWAY COMMUNICATION (JIANGSU) CO., LTD., Jiangsu (CN)

( * ) Notice: Subject to any disclaimer, the term of this patent is extended or adjusted under 35 U.S.C. 154(b) by 753 days.

(21) Appl. No.: 17/032,153

(22) Filed: Sep. 25, 2020

(65) Prior Publication Data

US 2021/0288402 A1 Sep. 16, 2021

Related U.S. Application Data

(63) Continuation of application No. PCT/CN2020/107730, filed on Aug. 7, 2020.

(30) Foreign Application Priority Data

Mar. 13, 2020 (CN) ......................... 202010175184.0

(51) Int. Cl.
*H01R 13/659* (2011.01)
*H01R 13/6582* (2011.01)

(52) U.S. Cl.
CPC ....... *H01R 13/659* (2013.01); *H01R 13/6582* (2013.01)

(58) Field of Classification Search
CPC .............. H01R 13/659; H01R 13/6582; H01R 13/6581; H01R 25/006; H01R 24/50
See application file for complete search history.

(56) References Cited

U.S. PATENT DOCUMENTS 6,074,218 A 6/2000 Wu et al.
9,190,751 B2 * 11/2015 Miyazaki ............. H01R 12/716
(Continued)

FOREIGN PATENT DOCUMENTS

CN 103151650 A 6/2013
CN 106816786 A 6/2017
(Continued)

OTHER PUBLICATIONS

Dec. 14, 2020 International Search Report issued in International Patent Application No. PCT/CN2020/107730.
(Continued)

*Primary Examiner* — Edwin A. Leon
(74) *Attorney, Agent, or Firm* — Stein IP, LLC

(57) ABSTRACT

A radio frequency connector with high transmission performance includes a male terminal and a female terminal which are plugged and matched with each other, wherein both the male terminal and the female terminal further includes shielding cases which include convex parts for isolating two signal terminals; and the shielding cases of the male terminal and the female terminal are matched and connected, and the two convex parts are matched with each other. An electromagnetic shielding case is formed and an isolation cavity for shielding signals is formed, so that signals transmitted by the radio-frequency connector will not be disturbed by external signals or internal signals, and the transmission stability of the signals in the radio-frequency connector is guaranteed.

10 Claims, 5 Drawing Sheets

(56) References Cited

U.S. PATENT DOCUMENTS

| | | | | |
|---|---|---|---|---|
| 9,203,172 | B2 * | 12/2015 | Kubo | H01R 13/10 |
| 11,621,528 | B2 * | 4/2023 | Ishida | H01R 13/665 439/620.21 |

FOREIGN PATENT DOCUMENTS

| | | | |
|---|---|---|---|
| CN | 109390806 | A | 2/2019 |
| CN | 209591641 | U | 11/2019 |

OTHER PUBLICATIONS

Nov. 26, 2020 Office Action issued in Chinese Patent Application No. 202010175184.0.

* cited by examiner

RADIO-FREQUENCY CONNECTOR WITH HIGH TRANSMISSION PERFORMANCE

TECHNICAL FIELD

The invention relates to the technical field of connectors, in particular to a radio-frequency connector with high transmission performance.

DESCRIPTION OF RELATED ART

Radio-frequency connectors, as interface elements for transmitting radio-frequency signals, are used for electrical connection or disconnection between devices, between assemblies, as well as between systems and sub-systems and for transmission of radio-frequency signals, and are typically applied to the fields of wireless communication equipment, automotive electronic equipment, medical instruments, aerospace, military navigation and the like.

The radio-frequency connectors are used to transmit radio-frequency signals. However, signals transmitted by existing radio-frequency connectors may be disturbed by other signals, so that the transmission stability of signals in the radio-frequency connectors is affected.

BRIEF SUMMARY OF THE INVENTION

The technical issue to be settled by the invention is to provide a radio-frequency connector with high transmission performance, which can guarantee the transmission stability of signals therein.

The technical solution adopted by the invention to settle the aforesaid technical issue is as follows:

A radio-frequency connector with high transmission performance comprises a male terminal and a female terminal which are plugged and matched with each other, wherein the male terminal comprises a first radio-frequency signal terminal and a first ground terminal, and the female terminal comprises a second radio-frequency signal terminal matched and connected with the first radio-frequency signal terminal and a second ground terminal matched and connected with the first ground terminal; the male terminal further comprises a first shielding case which includes a first convex part for accommodating at the first radio-frequency signal terminal, and the first ground terminal is located outside the first convex part; and the female terminal further comprises a second shielding case which includes a second convex part for accommodating the second radio-frequency signal terminal, and the second ground terminal is located outside the second convex part;

A peripherally enclosed structure is formed by the first shielding case and the second shielding case after the male terminal and the female terminal are plugged together, and an isolation cavity for shielding signals is formed by the first convex part and the second convex part after the male terminal and the female terminal are plugged together.

The invention has the following beneficial effects: according to the radio-frequency connector with high transmission performance, after the male terminal and the female terminal are plugged together, the first shielding case on the male terminal and the second shielding case on the female terminal form a peripherally enclosed structure which is equivalent to an electromagnetic shielding case, so that the terminals inside are protected against external disturbance during signal transmission; moreover, a convex part for isolating the radio-frequency signal terminal from the ground terminal is disposed on the first shielding case, and after the male terminal and the female terminal are plugged together, the two convex parts form an isolation cavity for shielding signals, so that the radio-frequency signal terminals are completely isolated from the ground terminals, radio-frequency signals are prevented against grounding disturbance, signals transmitted by the radio-frequency connector will not disturbed by external signals or internal signals, and the transmission stability of the signals in the radio-frequency connector is guaranteed.

REFERENCE SIGNS

Figure 1:
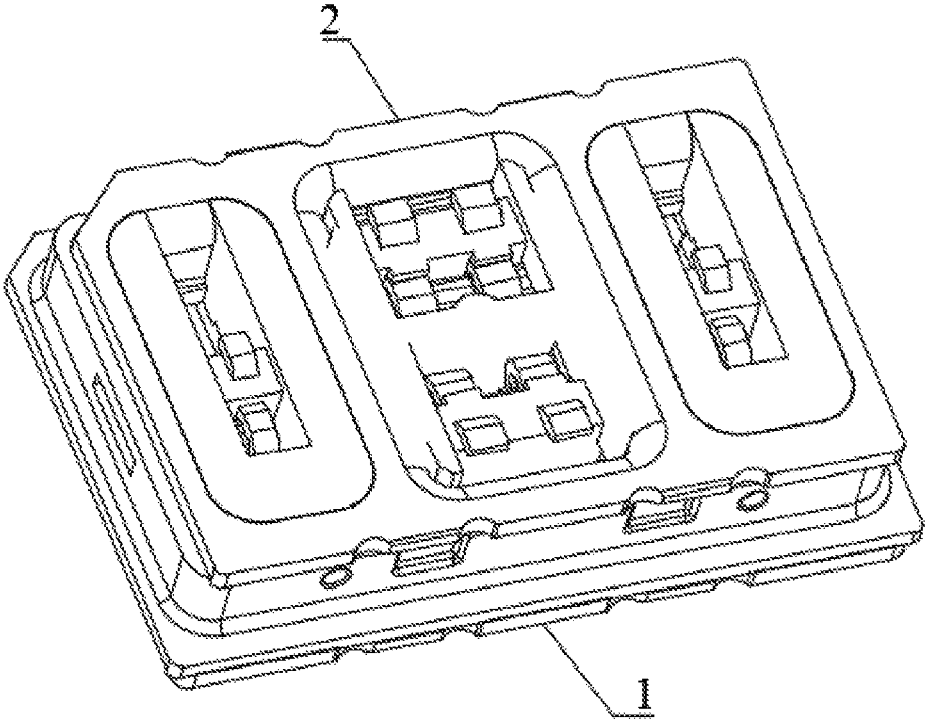
FIG. 1 is a collaboration diagram of a radio-frequency connector with high transmission performance in an embodiment of the invention.

1, male terminal; 2, female terminal; 11, first radio-frequency signal terminal; 12, first ground terminal; 13, first shielding case; 14, first digital signal terminal; 15, metal shield; 21, second radio-frequency signal terminal; 22, second ground terminal; 23, second shielding case; 24, second digital signal terminal; 131, first convex part; 132, first accommodating region; 133, first buckle; 151, third buckle; 231, second convex part; 232, third convex part; 233, second buckle.

DETAILED DESCRIPTION OF THE INVENTION

The technical contents, purposes and effects of the invention are expounded below in conjunction with the embodiments and accompanying drawings.

Referring to FIG. 1 to FIG. 7, a radio frequency connector with high transmission performance comprises a male terminal and a female terminal which are plugged and matched with each other, wherein the male terminal comprises a first radio-frequency signal terminal and a first ground terminal, and the female terminal comprises a second radio-frequency signal terminal matched and connected with the first radio-frequency signal terminal and a second ground terminal matched and connected with the first ground terminal; the male terminal further comprises a first shielding case which includes a first convex part for accommodating the first radio-frequency signal terminal, and the first ground terminal is located outside the first convex part; and the female terminal further comprises a second shielding case which includes a second convex part for accommodating the second radio-frequency signal terminal, and the second ground terminal is located outside the second convex part;

A peripherally enclosed structure is formed by the first shielding case and the second shielding case after the male terminal and the female terminal are plugged together, and an isolation cavity for shielding signals is formed by the first convex part and the second convex part after the male terminal and the female terminal are plugged together.

From the above description, the invention has the following beneficial effects: after the male terminal and the female terminal are plugged together, the first shielding case and the second shielding case form a peripherally enclosed structure which is equivalent to an electromagnetic shielding case, so that the terminals inside are protected against external disturbance during signal transmission; moreover, a convex part for isolating the radio-frequency signal terminal from the ground terminal is disposed on the first shielding case, and after the male terminal and the female terminal are plugged together, the two convex parts form an isolation cavity for shielding signals, so that the radio-frequency signal terminals are completely isolated from the ground terminals, radio-frequency signals are prevented against grounding disturbance, signals transmitted by the radio-frequency connector will not disturbed by external signals or internal signals, and the transmission stability of the signals in the radio-frequency connector is guaranteed.

Furthermore, a side wall of the first convex part abuts against a side wall of the second convex part.

From the above description, the side wall of the first convex part abuts against the side wall of the second convex part, so that an isolation cavity for shielding signals is formed; moreover, the side wall of the convex part of the first shielding case is connected with the side wall of the convex part of the second shielding case in an abutting manner, so that a peripherally enclosed structure is formed.

Furthermore, one first convex part is disposed on each of the left and right sides of the first shielding case, a first accommodating region for accommodating the first ground terminal is formed between the two first convex parts, one second convex part is disposed on each of the left and right sides of the second shielding case, and a third convex part for accommodating the second ground terminal is disposed between the two second convex parts;

The first convex parts are connected with the corresponding second convex parts in an abutting manner, and after the male terminal and the female terminal are plugged together, the third convex part encircles the first ground terminal in the first accommodating region.

From the above description, in case of multiple convex parts, the side walls of the convex parts of the first shielding case are connected with the corresponding side walls of the convex parts of the second shielding case in an abutting manner to form isolation cavities and a peripherally enclosed structure; the accommodating region without a convex part is encircled by the convex part at the other end, so that the terminal in the accommodating region is also isolated from other signal terminals.

Furthermore, a first digital signal terminal spaced apart from the first ground terminal is further disposed in the first accommodating region, and a second digital signal terminal spaced apart from the second ground terminal is further disposed in the third convex part.

The first digital signal terminal is matched and plugged with the second digital signal terminal.

From the above description, the mutual influence between digital signals and ground signals is small, and the digital signal terminals and the ground signals are located in the same cavity, so that mutual interference between radio-frequency signals and digital signals is avoided, and the transmission performance of the radio-frequency signals and the digital signals is guaranteed.

Furthermore, two first convex parts are symmetrically arranged on the left and right sides of the first shielding case, and the first radio-frequency signal terminals are disposed on center lines of the first convex parts;

Two second convex parts are symmetrically disposed on the left and right sides of the second shielding case, and the second radio-frequency signal terminals are disposed on center lines of the second convex parts.

From the above description, the radio-frequency signal terminals of the male terminal and the female terminal are disposed in cavities separately, wherein the two cavities for accommodating the first radio-frequency signal terminals on in the male terminal are first cavities of the same structure, and the two cavities for accommodating the second radio-frequency signal terminals on the second radio-frequency signal terminals on the female terminal are second cavities of the same structure, so that better impedance matching can be guaranteed, and the return loss is lower.

Furthermore, the male terminal is further provided with a metal shield disposed outside the first shielding case;

The metal shield is located on the outermost layer of the peripherally enclosed structure and comprises a continuous peripheral edge which is as high as or higher than the first shielding case.

From the above description, the metal shield is disposed outside the first shielding case and comprises the continuous peripheral edge which is as high as or higher than the first shielding case, so that internal signals can be protected against external disturbance more effectively; moreover, the metal shield is located on the outermost layer of the peripherally enclosed structure, that is, the shielding cases are located in the metal shield after the male terminal and the female terminal are plugged together, so that the strength of the connector can be guaranteed after the male terminal and the female terminal are plugged together, and the connector is not prone to deformation.

Furthermore, first buckles are disposed at positions, corresponding to peripheral walls of the first shielding case and contacting with the second convex parts, of the first convex parts, and second buckles are disposed at positions, corresponding to peripheral walls of the second shielding case and contacting with the first convex parts, of the second convex parts;

The first buckles are connected with the second buckles in a buckled manner.

From the above description, the male terminal and the female terminal of the connector can be matched more firmly through the buckles, and the convex parts are connected through buckles, so that the isolation cavities are better sealed; and the peripheral walls of the convex parts are connected through buckles, so that the peripherally enclosed structure is better sealed, and a better signal isolation effect is realized.

Furthermore, the first buckles are arc bumps which extend inwards, and the second buckles are arc grooves which are recessed inwards;

The arc bumps are connected with the arc grooves in a buckled manner.

Furthermore, the first buckles are arc grooves which are recessed inwards, and the second buckles are arc bumps which extend inwards;

The arc bumps are connected with the arc grooves in a buckled manner.

From the above description, the grooves and the bumps are designed for clamping, so that the isolation cavities are better sealed; the peripheral walls of the convex parts are connected through buckles, so that the male terminal and the female terminal of the connector can be matched more firmly, and a better signal isolation effect is realized; and a positioning effect is realized, so that the male terminal and the female terminal of the connector can be matched perfectly, and production and plugging are facilitated.

Furthermore, if the male terminal comprises a metal shield, third buckles are disposed on the metal shield and are connected with the first buckles in a buckled manner.

From the above description, the metal shield on the periphery can be clamped with bumps or grooves on the first shielding case through grooves or bumps, so that the male terminal and the female terminal of the connector can be matched more firmly, the strength of the connector is guaranteed after the male terminal and the female terminal are assembled together, and the connector is not prone to deformation.

Referring to FIG. 1 to FIG. 7, Embodiment 1 of the invention is as follows:

This embodiment is applied to a cable, device or facility requiring electrical connection.

A radio-frequency connector with high transmission performance comprises a male terminal 1 and a female terminal 2 which are plugged and matched with each other.

Figure 2:
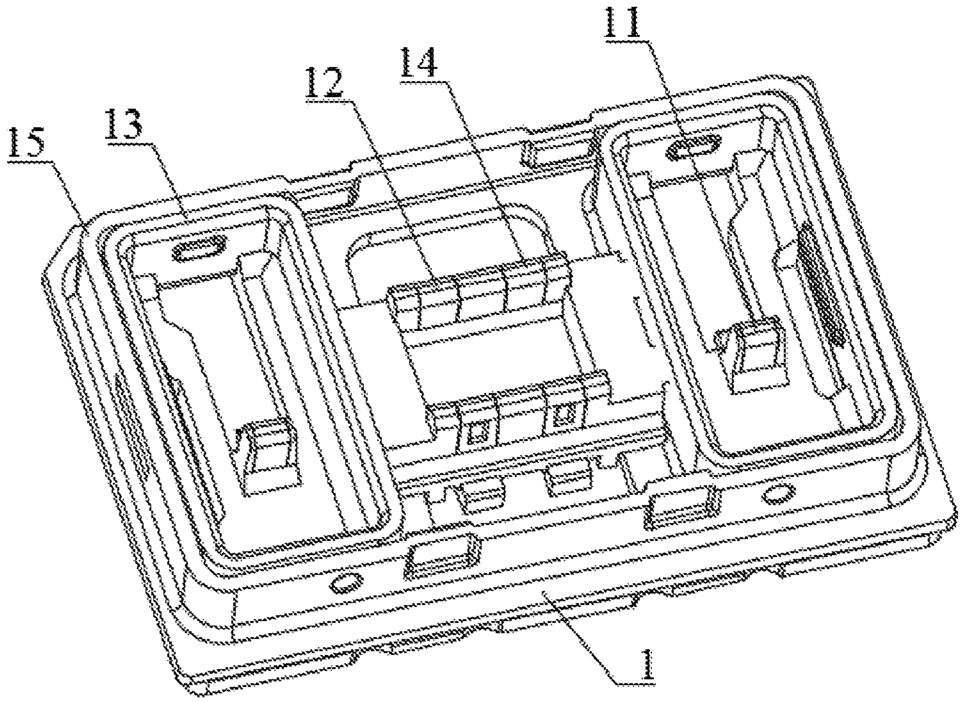
FIG. 2 is a perspective view of a male terminal in the embodiment of the invention.
Figure 3:
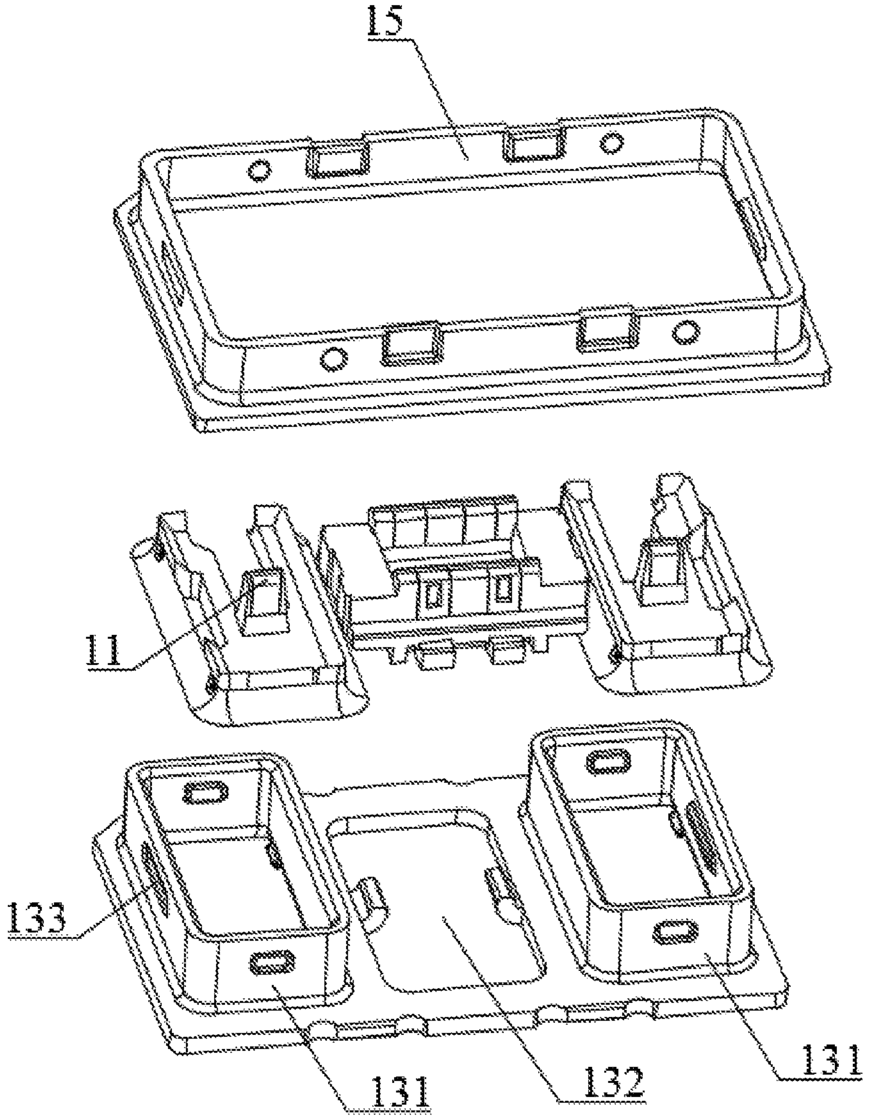
FIG. 3 is a disassembled view of the male terminal in the embodiment of the invention.

As shown in FIG. 2 and FIG. 3, the male terminal 1 comprises first radio-frequency signal terminals 11, a first ground terminal 12 and a first shielding case 13, wherein the first shielding case 13 comprises first convex parts 131 for accommodating the first radio-frequency signal terminals 11. Particularly, one first convex part 131 is disposed on each of the left and right sides of the first shielding case 13, and a first accommodating region 132 for accommodating the first ground terminal 12 is formed between the two first convex parts 131. It can be seen that the first ground terminal 12 is located outside the first convex parts 131 and thus is isolated from the first radio-frequency signal terminals 11 in the first convex parts 131.

Figure 4:
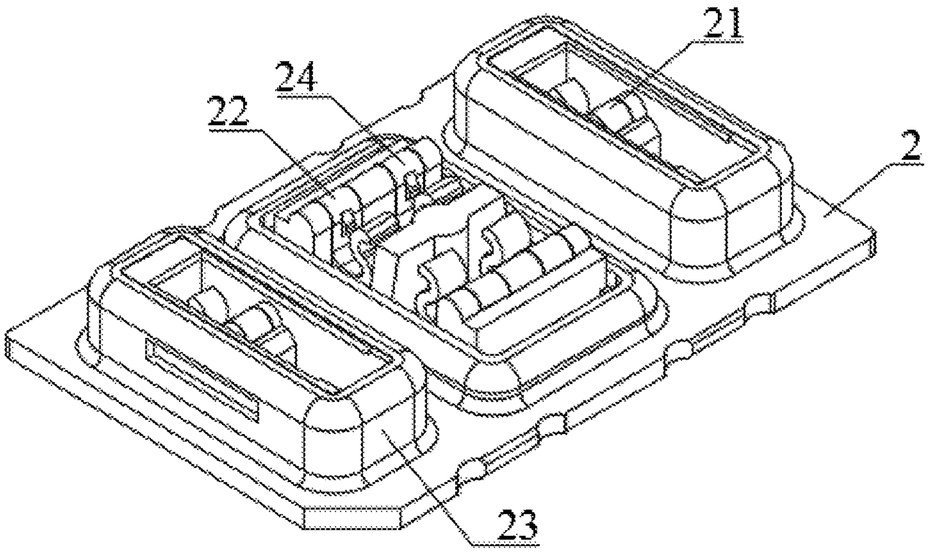
FIG. 4 is a perspective view of a female terminal in the embodiment of the invention.
Figure 5:
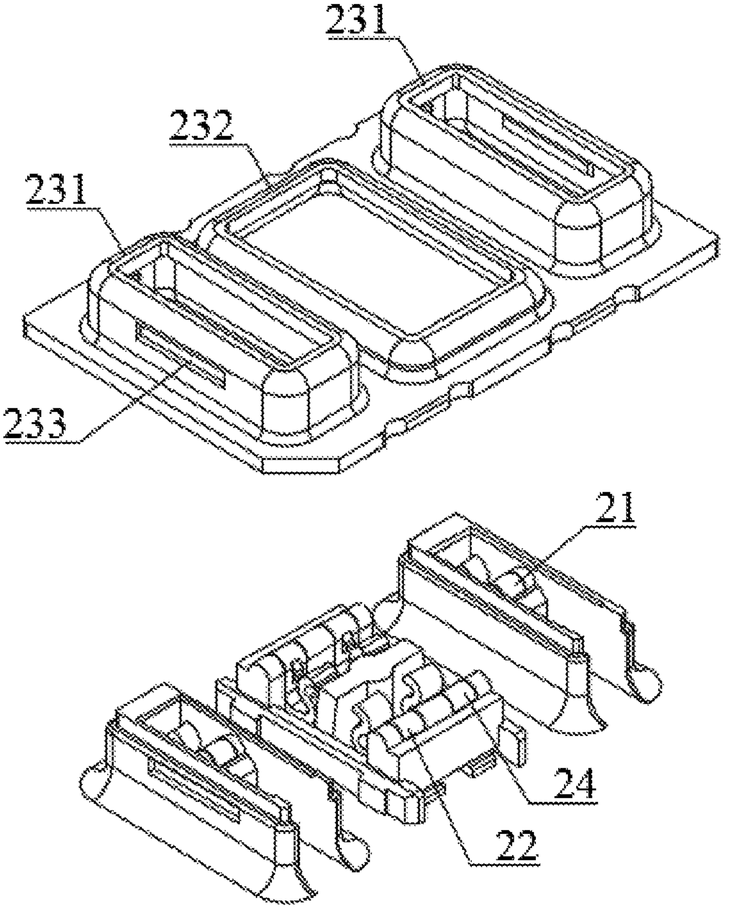
FIG. 5 is a disassembled view of the female terminal in the embodiment of the invention.
Figure 6:
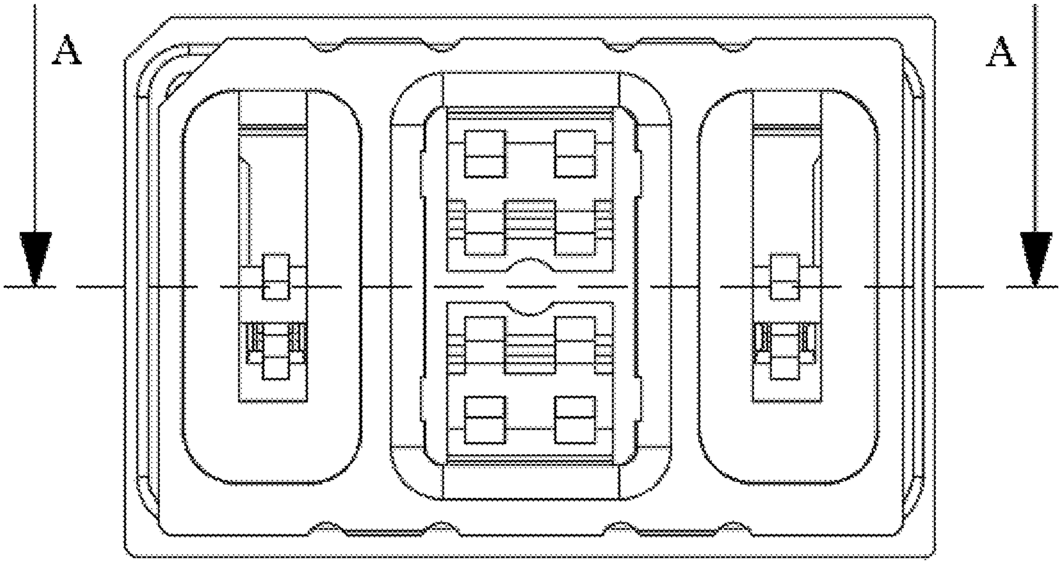
FIG. 6 is a front view of FIG. 1.

As shown in FIG. 4 and FIG. 5, the female terminal 2 comprises second radio-frequency signal terminals 21 matched and connected with the first radio-frequency signal terminals 11, a second ground terminal 22 matched and connected with the first ground terminal 12, and a second shielding case 23, wherein the second shielding case 23 comprises second convex parts 231 for accommodating the second radio-frequency signal terminals 21 and a third convex part 232 for accommodating the second ground terminal 22. Particularly, one second convex part 231 is disposed on each of the left and right sides of the third convex part 232. It can be seen that the second ground terminal 22 is located outside the second convex parts 231 and thus is isolated from the second radio-frequency signal terminals 21 in the second convex parts 231.

Wherein, side walls of the first convex parts 131 abut against side walls of the second convex parts 231. Specifically, in this embodiment, inner side walls of the first convex parts 131 on the left and right sides of the first shielding case 13 correspondingly abut against outer side walls of the second convex parts 231 on the left and right sides of the second shielding case 23, and the third convex part 232 in the middle of the second shielding case 23 encircles the first ground terminal 12 in the first accommodating region 132 after the male terminal 1 and the female terminal 2 are plugged together, so that after the male terminal 1 and the female terminal 2 are plugged together, the first shielding case 13 and the second shielding case 23 form a peripherally enclosed structure to protect the terminals inside against external disturbance during signal transmission; moreover, after the male terminal 1 and the female terminal 2 are plugged together, the first convex parts 131 and the second convex parts 231 form isolation cavities for shielding signals, and the third convex part 232 encircles the first ground terminal 12 to form another isolation barrier to avoid mutual disturbance between radio-frequency signals and ground signals, so that the transmission stability of signals in the radio-frequency connector is guaranteed.

Wherein, in other equivalent embodiments, the side walls of the first convex parts 131 abut against the side walls of the second convex parts 231 may be implemented in a manner that outer side walls of the first convex parts 131 are connected with inner side walls of the second convex parts 231 in an abutting manner or in a manner that the side walls of the second convex parts 231 are used as bumps to be inserted into slots formed in the side walls of the first convex parts 131 to realize connection.

In this embodiment, as shown in FIG. 2, two first convex parts 131 are symmetrically disposed on the left and right sides of the first shielding case 13, and the first radio-frequency signal terminals 11 are located on center lines of the first convex parts 131; as shown in FIG. 4, two second convex parts 231 are symmetrically disposed on the left and right sides of the second shielding case 23, and the second radio-frequency signal terminals 21 are located on center lines of the second convex parts 231, so that better impedance matching is guaranteed, and the return loss is lower.

Referring to FIG. 1 to FIG. 7, Embodiment 2 of the invention is as follows:

This embodiment is applied to a cable, device or facility requiring electrical connection.

On the basis of Embodiment 1, a radio-frequency connector with high transmission performance in this embodiment is characterized in that: as shown in FIG. 2 and FIG. 3, the male terminal 1 is further provided with a metal shield 15 disposed outside the first shielding case 13, and the metal shield 15 is located on the outermost layer of the peripherally enclosed structure and comprises a continuous peripheral edge which is as high as or higher than the first shielding case 13. That is, the metal shield 15 is disposed outside the first shielding case 13 and comprises the continuous peripheral edge which is as high as or higher than the first shielding case 13, so that internal signals can be protected against external disturbance more effectively. Moreover, the metal shield 15 is located on the outermost layer of the peripherally enclosed structure, that is, the shielding cases are located in the metal shield 15 after the male terminal and the female terminal are plugged together, so that the strength of the connector can be guaranteed after the male terminal and the female terminal are plugged together, and the connector is not prone to deformation.

Referring to FIG. 1 to FIG. 7, Embodiment 3 of the invention is as follows:

This embodiment is applied to a cable, device or facility requiring electrical connection.

On the basis of Embodiment 1, a radio-frequency connector with high transmission performance in this embodiment is characterized in that: a first digital signal terminal 14 spaced apart from the first ground terminal 12 is further disposed in the first accommodating region 132, as shown in FIG. 2; a second digital signal terminal 24 spaced apart from the second ground terminal 22 is further disposed in the third convex part 232; and the first digital signal terminal 14 is matched and plugged with the second digital signal terminal 24, so that mutual disturbance between digital signals and radio-frequency signals is avoided, as shown in FIG. 4.

Referring to FIG. 1 to FIG. 7, Embodiment 4 of the invention is as follows:

This embodiment is applied to a cable, device or facility requiring electrical connection.

On the basis of Embodiment 1, a radio-frequency connector with high transmission performance in this embodiment is characterized in that: as shown in FIG. 3, a left peripheral wall of the first shielding case 13 is a left side wall of the first convex part 131 on the left side, a right puerperal wall of the first shielding case 13 is a right side wall of the first convex part 131 on the right side, a front side wall and a rear side wall of the first shielding case 13 include a front side wall and a rear side wall corresponding to the convex parts on the left and right sides, and first buckles 133 are disposed on the left side wall, the front side wall and the rear side wall of the first convex part 131 on the left and on the right side wall, the front side wall and the rear side wall of the first convex part 131 on the right. In this embodiment, one buckle is disposed on each of the corresponding side walls of the first convex parts. In other equivalent embodiments, buckles may be disposed around the side walls or may be disposed on at least one side wall.

As shown in FIG. 5, a left peripheral wall of the second shielding case 23 is a left side wall of the second convex part 231 on the left side, a right puerperal wall of the second shielding case 23 is a right side wall of the second convex part 231 on the right side, a front side wall and a rear side wall of the second shielding case 23 include a front side wall and a rear side wall corresponding to the left, middle and right convex parts, and second buckles are disposed on the left side wall, the front side wall and the rear side wall of the second convex part 231 on the left side, on the right side wall, the front side wall and the rear side wall of the second convex part 231 on the right side, and the front side wall and the rear side wall of the third convex part 232 in the middle. In this embodiment, the second buckles 233 are merely disposed on the left side wall of the second convex part 231 on the left side and on the right side wall of the second convex part 231 on the right side. In other equivalent embodiments, the buckles may be disposed around the side walls or may be disposed on at least one side wall.

Specifically, the first buckles 133 are arc bumps which extend inwards, as shown in FIG. 3; the second buckles 233 are arc grooves which are recessed inwards, as shown in FIG. 5; and the arc bumps are connected with the arc grooves through buckles, so that the male terminal 1 and the female terminal 2 of the connector can be matched more firmly; the convex parts are connected through buckles, so that the isolation cavities are better sealed; the peripheral walls of the convex parts are connected through buckles, so that the peripherally enclosed structure is better sealed, and a better signal isolation effect is realized; moreover, a positioning effect is realized, so that the male terminal 1 and the female terminal 2 of the connector can be matched perfectly, and production and plugging are facilitated.

Correspondingly, in other equivalent embodiments based on Embodiment 2, the male terminal 1 is further provided with a metal shield 15 disposed outside the first shielding case 13, and third buckles 151 are disposed on the metal shield 15 and are connected with the first buckles 133 in a buckled manner.

Figure 7:
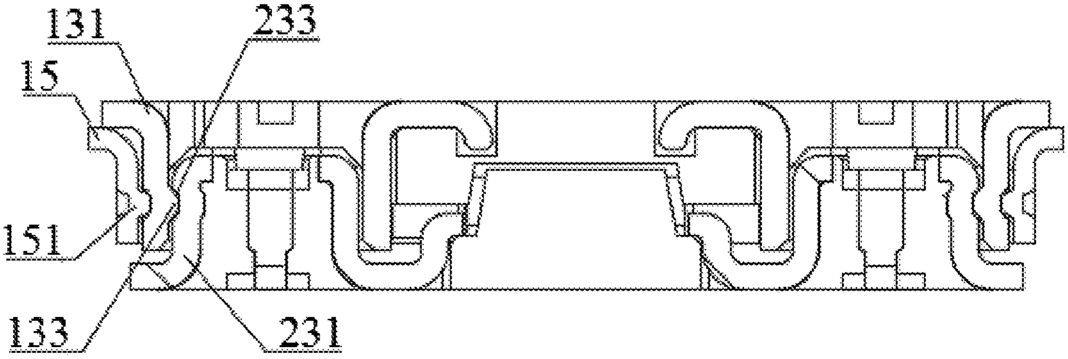
FIG. 7 is a sectional view along line A-A in FIG. 6.

As shown in FIG. 3 and FIG. 7, the first buckles 133 are arc bumps which extend inwards, arc grooves are formed in the sides, corresponding to the metal shield 15, of the first buckles 133, and the third buckles 151 are arc bumps which extend inwards, so that the metal shield 15 can be clamped on the first shielding case 13.

In other equivalent embodiments, the first buckles 133 may be arc grooves which are recessed inwards, and the second buckles 233 may be arc bumps which extend inwards. In addition, the first buckles 133, the second buckles 233 and the third buckles 151 may be other buckles that can be matched and connected in a buckled manner.

According to the radio-frequency connector with high transmission performance, after the male terminal and the female terminal are plugged together, the first shielding case on the male terminal and the second shielding case on the female terminal form a peripherally enclosed structure which is equivalent to an electromagnetic shielding case, so that the terminals inside are protected against external disturbance during signal transmission; moreover, multiple convex parts for isolating the radio-frequency signal terminals, the ground terminal and the digital signal terminal are disposed on the first shielding case, and multiple isolation cavities for shielding signals are formed by the multiple convex parts after the male terminal and the female terminal are plugged together, so that the radio-frequency signal terminals are completely isolated from the ground terminal and the digital signal terminal to be prevented against grounding disturbance and interaction with digital signals, signals in the radio-frequency connector will not be disturbed by external signals or internal signals, and thus, the transmission stability of the signals in the radio-frequency connector is guaranteed. In addition, the radio-frequency signal terminals of the male terminal and the female terminal are located in cavities separately, the two cavities for accommodating the first radio-frequency signal terminals on the male terminal are first cavities of the same structure, and the two cavities for accommodating the second radio-frequency signal terminals on the female terminal are second cavities of the same structure, so that better impedance matching is guaranteed, and the return loss is lower. The metal shield is disposed outside the first shielding case and comprises the continuous peripheral edge which is as high as or higher than the first shielding case, so that internal signals can be protected against external disturbance more effectively. Besides, the metal shield is located on the outermost layer of the peripherally enclosed structure, that is, the shielding cases are located in the metal shield after the male terminal and the female terminal are plugged together, so that the strength of the connector can be guaranteed after male terminal and the female terminal are plugged together, and the connector is not prone to deformation. The grooves and the bumps are designed for clamping, so that the isolation cavities are better sealed; the peripheral walls of the convex parts are connected through buckles, so that the male terminal and the female terminal of the connector can be matched more firmly, and a better signal isolation effect is realized; and a positioning effect is realized, so that the male terminal and the female terminal of the connector can be matched perfectly, and production and plugging are facilitated.

The above embodiments are merely illustrative ones, and are not intended to limit the patent scope of the invention. All equivalent transformations obtained on the basis of the contents in the specification and drawings of the invention, or direct or indirect applications to relating technical fields should also fall within the patent protection scope of the invention.

The invention claimed is:

1. A radio-frequency connector with high transmission performance, comprising a male terminal and a female terminal which are plugged and matched with each other, the male terminal comprising a first radio-frequency signal terminal and a first ground terminal, and the female terminal comprising a second radio-frequency signal terminal matched and connected with the first radio-frequency signal terminal and a second ground terminal matched and connected with the first ground terminal; wherein the male terminal further comprises a first shielding case which includes a first convex part for accommodating the first radio-frequency signal terminal, the first ground terminal is located outside the first convex part, the female terminal further comprises a second shielding case which includes a second convex part for accommodating the second radio-frequency signal terminal, and the second ground terminal is located outside the second convex part;

a peripherally enclosed structure is formed by the first shielding case and the second shielding case after the male terminal and the female terminal are plugged together, and an isolation cavity for shielding signals of the first and second radio-frequency terminals from the ground terminal is formed by the first convex part fitting into the second convex part after the male terminal and the female terminals are plugged together.

2. The radio-frequency connector with high transmission performance according to claim 1, wherein a side wall of the first convex part abuts against a side wall of the second convex part.

3. The radio-frequency connector with high transmission performance according to claim 1, wherein one said first convex part is disposed on each of left and right sides of the first shielding case, a first accommodating region for accommodating the first ground terminal is formed between the two first convex parts, one said second convex part is disposed on each of left and right sides of the second shielding case, and a third convex part for accommodating the second ground terminal is disposed between the two second convex parts;

the first convex parts fit into the corresponding second convex parts in an abutting manner, and the third convex part encircles the first ground terminal in the first accommodating region after the male terminal and the female terminal are plugged together.

4. The radio-frequency connector with high transmission performance according to claim 3, wherein a first digital signal terminal spaced apart from the first ground terminal is further disposed in the first accommodating region, and a second digital signal terminal spaced apart from the second ground terminal is further disposed in the third convex part;

the first digital signal terminal is matched and plugged with the second digital signal terminal.

5. The radio-frequency connector with high transmission performance according to claim 3, wherein the two first convex parts are symmetrically disposed on the left and right sides of the first shielding case, and the first radio-frequency signal terminals are located on center lines of the first convex parts;

the two second convex parts are symmetrically disposed on the left and right sides of the second shielding case, and the second radio-frequency signal terminals are located on center lines of the second convex parts.

6. The radio-frequency connector with high transmission performance according to claim 1, wherein the male terminal is further provided with a metal shield disposed outside the first shielding case;

the metal shield is located on an outermost layer of the peripherally enclosed structure and comprises a continuous peripheral edge of the peripherally enclosed structure and which is as high as or higher than the first shielding case.

7. The radio-frequency connector with high transmission performance according to claim 2, wherein first buckles are disposed at positions, corresponding to peripheral walls of the first shielding case and contacting with the second convex parts, of the first convex parts, and second buckles are disposed at positions, corresponding to peripheral walls of the second shielding case and contacting with the first convex parts, of the second convex parts;

the first buckles are connected with the second buckles in a buckled manner.

8. The radio-frequency connector with high transmission performance according to claim 7, wherein the first buckles are arc bumps which extend inwards, and the second buckles are arc grooves which are recessed inwards;

the arc bumps are connected with the arc grooves in a buckled manner.

9. The radio-frequency connector with high transmission performance according to claim 7, wherein the first buckles are arc grooves which are recessed inwards, and the second buckles are arc bumps which extend inwards;

the arc bumps are connected with the arc grooves in a buckled manner.

10. The radio-frequency connector with high transmission performance according to claim 7, wherein the male terminal comprises a metal shield, and third buckles are disposed on the metal shield and are connected with the first buckles in a buckled manner.

* * * * *